Aug. 2, 1938.  G. KUCHENMEISTER  2,125,677
BEVERAGE COOLER AND FITTING
Filed Aug. 5, 1937
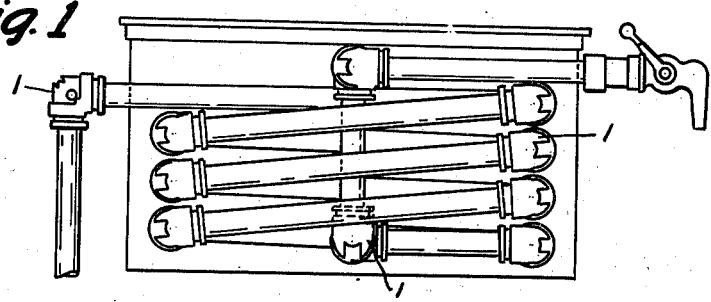
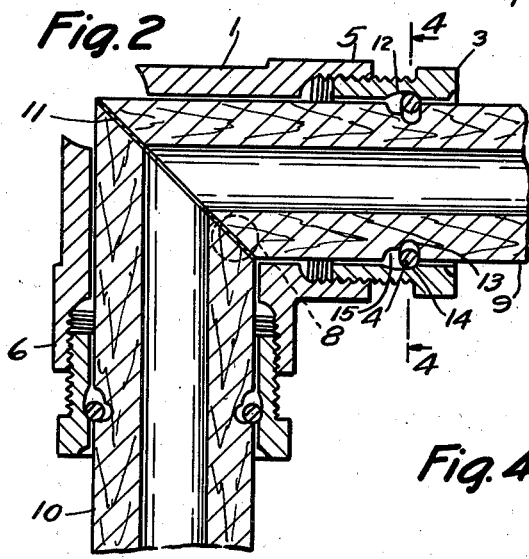
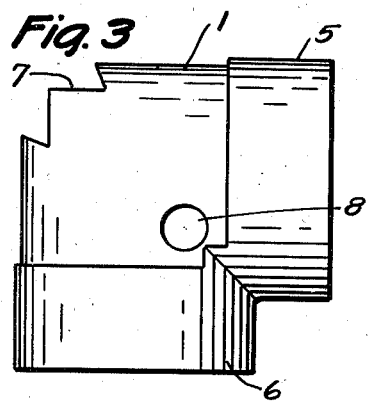
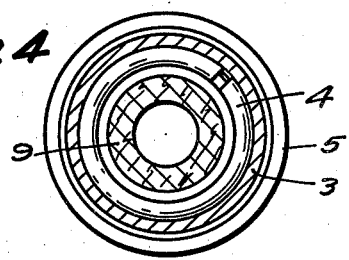
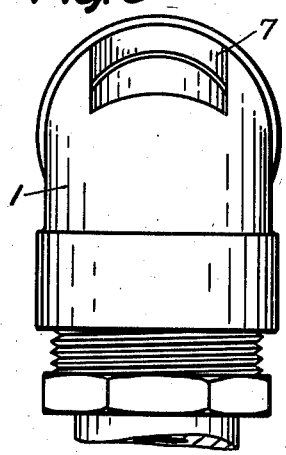
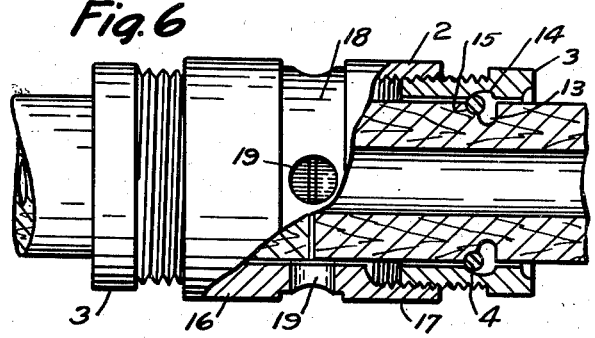
INVENTOR.
George Kuchenmeister
BY James Harrison Bowen
ATTORNEY.

Patented Aug. 2, 1938

2,125,677

UNITED STATES PATENT OFFICE 2,125,677

BEVERAGE COOLER AND FITTING

George Kuchenmeister, Hastings on Hudson, N. Y.

Application August 5, 1937, Serial No. 157,607

1 Claim. (Cl. 285—166)

The purpose of this invention is to provide a beverage cooler, particularly adapted for beer and other beverages, where it is desired to prevent contact of the beverage with metal, in which the beverage may be contained in wood throughout the device, and in which means is provided for joining the wood sections by clamping the end of one section against that of another, providing a sealed joint.

The invention is a coil and fitting, in which the coil is formed of wood pipe with a charred inner surface, and the fitting is adapted to fit loosely over the pipe with means therein for gripping and forcing the ends of pipes held therein together with a wedge action, and in which an absolute seal is obtained.

Many attempts have been made to provide a cooler, particularly for beer, in which all contact thereof with metal is eliminated, and many devices have been provided with linings of various substances to protect the beer from the metal, however, it has been found substantially impossible with any fitting, housing or coupling used heretofore to join the ends of wood pipe in such a manner that fluid may be flowed continuously therethrough without engaging metal at any point, and without leakage; and it is an established fact that the taste of beer, or, in fact, any beverage that is contained in wood, is far superior to that of a beverage contained in metal or any other material.

The object of this invention is, therefore, to provide a device by which the ends of two sections of wood pipe may be joined together, and securely clamped with one against the other, so that the possibility of any leakage between the two is eliminated.

Another object is to provide a joint for the ends of wood pipe, in which all pockets around the joint are eliminated, and in which the joint is open providing inspection, and also providing an escape for any fluid that may leak therethrough.

A further object is to provide means for joining the ends of two sections of wood pipe together, in which the said ends are forced against each other, and in which any wear therebetween may readily be taken up at any time.

And a still further object is to provide means for joining sections of wood or other pipe together without threads in the outer surface of the pipe, and which may readily be applied to substantially any pipe which clamps the ends together, and which is of a relatively simple and economical construction.

With these ends in view the invention embodies a fitting having a housing with bushings threaded into the ends thereof, and spring rings adapted to be forced into grooves in the surface of the pipe during assembling, and which spring outward into recesses in the bushing and pipe providing holding means between the two parts, so that the pipe may be drawn inward as the bushing is screwed inward. The bushing may be provided with openings where the two ends of the pipe meet, a compound may be provided between the two ends of the pipe, and the internal surface of the pipe may be charred or treated to form a coating thereover.

Other features and advantages of the invention will appear from the following description taken in connection with the drawing, wherein:

Figure 1 is a view illustrating a pipe coil in a cooler, however, it will be understood that the cooler may be of any type or design, and the pipe may be arranged in it in any manner.

Figure 2 is a cross section through a right angle joint between two sections of pipe.

Figure 3 is a side elevation of the housing of the joint shown in Figure 2.

Figure 4 is a cross section through a bushing at the end of the housing, showing a spring ring used as the clamping member used between the bushing and pipe.

Figure 5 is a view showing an end elevation of the fitting shown in Figure 2.

Figure 6 is a view showing a fitting adapted to hold two straight lengths of pipe together, with part broken away showing a section therethrough.

In the drawing the device is shown as it may be made, wherein numeral 1 indicates the housing of an angular fitting, numeral 2 the housing of a straight fitting, numeral 3, a bushing that may be used in either type of housing, and numeral 4, a spring ring that may also be used in a fitting of any type.

The housing 1 is made as shown in Figures 2, 3, and 5, with internally threaded bosses 5 and 6, and a central portion referred to by the numeral 1, and the central portion 1 is provided with an opening 7 at the corner, and additional openings 8 at the intersection of the two parts, thereby making it possible to inspect the joint between the two sections 9 and 10 of the wood pipe, both of which are formed with a beveled surface at an angle of 45°, and these two surfaces engage on a line 11, and any suitable cement or compound may be used between the two surfaces if desired.

The bushings 3 are threaded into the bosses 5 and 6 as shown, and the inner surfaces of the bushings are provided with a circular recess 12, in which the spring ring 4 snaps after the bushings are in place. The pipe is provided with a recess 13 into which the spring ring 4 may be compressed as the bushing 3 is placed over the pipe, and, after the bushing is in place, the ring 4 springs outward into the recess 12, and then, as the bushing is screwed inward, the base 14 of the recess 12 will engage the spring ring 4, forcing the ring into the part 15 of the recess in the pipe which is of a relatively larger diameter, and which is adapted to hold the ring with the outer part thereof extending beyond the surface of the pipe, and adapted to be engaged by the part 14, and, as the bushing is screwed inward, the part 14, engaging the ring 4, forces the pipe inward, thereby clamping the ends of the two sections of pipe together, and should any wear occur, or should there be any leakage between the two ends of the pipe, the bushings may be screwed further inward to force or jam the ends of the pipe together. With the joint formed in this manner it is possible to couple the ends of wood pipe together without a gasket or any sealing means, however, glue or any compound desired may be used to insure a sealed joint.

The fitting shown in Figure 6 is similar to that shown in Figure 2 except that the two ends are in a straight line, and this is formed with bosses 16 and 17 joined by an intermediate section 18 having openings 19 therein providing means for inspecting the joint between the two pieces of pipe, and the bushings, spring rings, and recesses are the same in this design as those shown in Figure 2.

It will be appreciated that a housing of any other type or design may be provided for different joints, such as a 45° angle or elbow, and any type of fitting such as a T or Y may be used.

It will be understood that other changes may be made in the construction without departing from the spirit of the invention. One of which changes may be in the use of a pipe of any other material instead of wood as shown and described, another may be in the use of other means for securing the bushings in the ends of the housing, as, although screw fittings are indicated, the same device may be applied to flange fittings, and still another may be in the use of this fitting for any other purpose.

The construction will be readily understood from the foregoing description. In use the device may be provided as shown and described, and any length of sections of pipe desired may be secured together either by the straight or angular fittings, and these may be assembled to form a coil, or cooler, or straight lengths of pipe, and they may be enclosed in tanks or used in the open as may be desired.

Providing this particular type of fitting makes it possible to join lengths of pipe together with as many joints as may be necessary, so that it is possible to assemble a relatively small wood pipe coil which may be enclosed in a casing or tank as shown in Figure 1, and packed with ice or any refrigerant, so that it is possible, particularly for beer and similar beverages, to eliminate all contact thereof with metal, and provide a continuous wood system, with the beverage contained therein in contact with the wood only throughout the entire system.

Having thus fully described the invention, what I claim as new, and desire to secure by Letters Patent, is:

In a cooler for fluids and the like of the type having a coil of wood pipe lengths, fittings connecting the ends of the said pipe lengths comprising a coupling member having internally threaded ends, and with the inside diameter thereof slightly larger than, and spaced from, the outer surfaces of said pipe lengths, said member also having relatively large side openings exposing to view abutting ends of pipe lengths held therein, bushings with internal recesses threaded into the ends of said coupling member, said pipe lengths having external recesses positioned to correspond with the internal recesses of the bushings, the recesses of said pipe lengths having two diameters, with the larger diameter positioned toward the end of the pipe, and expanding spring rings in the recesses in the pipe lengths adapted to be crowded into the recesses to permit the passage of the threaded bushings thereover, and adapted to expand into the recesses of the bushings, and forced into the portions of the recesses of the pipe lengths having the larger diameter, providing positive holding means between the pipe lengths and bushings, said device characterized in that the pipe is separated from and suspended in the fittings, and the abutting ends of the pipe lengths forced together by the fittings forming sealed joints.

GEORGE KUCHENMEISTER.